Patented July 4, 1950

2,513,534

UNITED STATES PATENT OFFICE 2,513,534

PURIFICATION OF CYCLOPENTANONE

Amos Turk, Mount Lebanon, Pa., assignor to the United States of America as represented by the Secretary of the Navy No Drawing. Application December 30, 1944, Serial No. 570,809

6 Claims. (Cl. 260—586)

The present invention relates generally to the purification of crude cycloalkanones and more particularly to a new and improved method of purifying crude cyclic ketones of the type

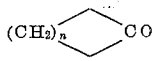

Many commercial samples of cycloalkanones contain varying amounts of impurities of unknown composition which probably consist of by-products formed during the manufacture of the cyclic ketones. These impurities may interfere with subsequent reactions in which the crude ketone is employed, or result in the formation of products that are difficult to purify. Thus, for example, many samples of commercial cyclopentanone (I) are dark in color and when such material is condensed with formaldehyde for the purpose of forming the tetramethylol derivative (II) there is obtained a dark red oil which is not easy to purify in good yield. If this dark red oil is then nitrated to give the tetranitrate derivative (III) the reaction product is likewise strongly colored and difficult of purification.

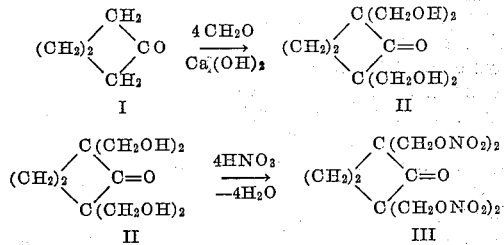

The object of the present invention is to provide a simple, commercially feasible process of purifying crude commercial grades of cycloalkanones.

A more particular object is the provision of a process of purifying crude cyclopentanone by a method that ensures the recovery in high yields of a substantially colorless grade of cyclopentanone.

Another object is a process of the character described which involves the treatment of the crude cyclopentanone with an agent that renders possible the elimination of the colored impurities in the crude material without material effect upon the cyclopentanone contained in the crude product.

Still another object is the provision of a process of purifying crude cyclopentanone to such a degree that it is suitable for use in the preparation of tetramethylolcyclopentanone and tetramethylolcyclopentanone tetranitrate.

Other objects and advantages will be apparent as the invention is hereinafter more particularly described.

In accordance with the present invention, it has been found that crude cycloalkanones such as commercial cyclopentanone may be purified by heating the cyclic ketone with an acid selected from the group consisting of phosphoric acid, chromic acid and hydrochloric acid. After a short period of digestion of the ketone with any of the foregoing acids, the ketone may be recovered in high yields as a clear, generally colorless liquid, merely by distilling the ketone from the reaction mixture, preferably under reduced pressure.

Syrupy phosphoric acid constitutes the preferred acid for the purification of cyclic ketones in accordance with the present invention. The crude ketone is merely mixed with a small proportion (e. g., 2–20% by volume) of syrupy phosphoric acid, the mixture is refluxed for a short period of time and the ketone then distilled. In some instances, depending on the particular cyclic ketone undergoing treatment and the nature and proportion of impurities in the crude material, digestion for as little as 5 minutes prior to distillation is sufficient. Actually the cyclic ketone itself (as distinguished from the impurities) appears to be essentially inert under the conditions of purification and therefore the reaction mixture may be heated almost indefinitely without substantial impairment of the yield of refined ketone produced by the process of the present invention. In the case of crude cyclopentanone, the digestion of the crude material with about 2 to about 10% by volume of syrupy phosphoric acid for about 5 to 10 minutes at the boiling point of the reaction mixture will usually be adequate. It will thus be seen that the preferred embodiment of the present invention involves merely a simple and brief treatment of the crude ketone with phosphoric acid. No subsequent steps other than simple distillation are required.

In order still more clearly to disclose the nature of the present invention a typical example will hereinafter be described. In this example the purified cyclopentanone was subsequently used in the synthesis of tetramethylolcyclopentanone in order to observe the difference in quality of the product obtained when the purified cyclopentanone was substituted for crude cyclopentanone in this synthetic reaction.

It should be clearly understood that the example is not intended to delineate the scope of the invention but merely to exemplify by means of a specific application, the broad principles described above.

EXAMPLE. — PREPARATION OF TETRAMETHYLOLCYCLOPENTANONE FROM CRUDE CYCLOPENTANONE

A. *Purification of cyclopentanone*

The crude cyclopentanone used was dark in color, and yielded a dark red oil when condensed with formaldehyde according to the procedure used for the synthesis of tetramethylol cyclopentanone.

This crude cyclopentanone (420 g., 5 mols) was mixed with syrupy phosphoric acid (24 ml., 62 g.) and refluxed gently for 10 minutes. Considerable darkening took place. The mixture was then cooled to about 50° C. and distilled under partial vacuum into a receiver cooled with ice-salt mixture. The pot temperature during distillation was in the range of 50 to 80° C., the vapor temperature 40 to 80° C. Distillation was carried out as rapidly as the condensing system would permit without loss of distillate; all the distillable liquid was collected in one receiver. A capillary tube was used to aid the boiling.

The distillate was 398.5 grams (95% recovery) of almost colorless liquid. It consisted mostly of wet cyclopentanone and contained a small lower aqueous layer, which need not be separated if the ketone is to be used for the synthesis of the tetramethylol derivative.

B. *Preparation of tetramethylolcyclopentanone*

All the distillate obtained as described above was condensed with 1515 ml. of 37% formaldehyde (105% of theoretical quantity for 400 g. of cyclopentanone) according to the procedure described and claimed in Fisher application, Ser. No. 570,810, filed of even date herewith. The reaction proceeded normally. Evaporation of the solution after reaction was complete yielded a mixture of colorless oil and white crystals which hardened on standing to a white crystal cake. This product had no tinge of red color. It is washed with methanol and dried. The final yield was 850 grams of white product, M. P. 136–138° C., representing a yield of 88% based on the 398.5 grams of distilled wet cyclopentanone, or a yield of 83% based on the original 420 grams of crude cyclopentanone.

*Discussion of experimental conditions*

*Phosphoric acid treatment.*—Phosphoric acid exerts little influence on pure cyclopentanone. Pure cyclopentanone (50 g.) mixed with syrupy phosphoric acid, (5 cc., 9 g.) formed a homogeneous solution with a slight spontaneous warming and almost no coloration. After refluxing the mixture for one half hour, only a slight coloration (pale straw) was evident. The material was neutralized with sodium hydroxide, extracted with ether, dried and distilled. Allowing for handling losses, all the pure cyclopentanone was recovered.

Using the crude cyclopentanone referred to above, and a ratio of 5 cc. (9 g.) of syrupy phosphoric acid to 50 grams of cyclopentanone, the effect of time and temperature was observed. These data are listed in Table I.

*Table I*

| Phosphoric Acid Treatment | Remarks |
|---|---|
| Stir 1 hour at room temperature. | Product is not suitable for synthesis of tetramethylol derivative; it gives a red oil when condensed with formaldehyde. |
| Reflux 5 minutes | Product is suitable for synthesis of tetramethylol derivative; it gives a white crystalline derivative. |
| Reflux 15 minutes | Same. |
| Reflux 30 minutes | Same. |

The products obtained by the treatments indicated in Table I were isolated by neutralizing the mixture with sodium hydroxide, extracting with ether, drying and distilling. It was subsequently found that most of these steps could be eliminated and that distillation alone was sufficient. These developments are incorporated in the improved procedure described in the example.

Using a crude cyclopentanone the effect of ratio of phosphoric acid to cyclopentanone was observed, and is shown in Table II.

*Table II*

| Treatment of 50 Grams of Cyclopentanone | Remarks |
|---|---|
| Reflux with 1 cc. phosphoric acid for 10 minutes. | Product is not suitable for synthesis of tetramethylol derivative; it gives a red oil. |
| Reflux with 3 cc. phosphoric acid. | Product is suitable for synthesis of tetramethylol derivative; it gives a white crystalline product. |
| Reflux with 5 cc. phosphoric acid for 5 minutes. | Same. |

The standard procedure adopted as a result of the foregoing tests was a ten minute reflux using 4 cc. of phosphoric acid for 50 grams of the crude cyclopentanone.

*Other agents.*—Alkali treatment of cyclopentanone caused polymerization. The use of nitric or sulfuric acid brought about charring of the cyclopentanone. The use of concentrated hydrochloric acid successfully brought about the purification of the crude cyclopentanone, but this procedure is somewhat less satisfactory than the phosphoric acid method for two reasons: first, the volatility of hydrochloric acid is a disadvantage; and, second, the hydrochloric acid seems to give a somewhat darker product and slightly poorer yield of purified cyclopentanone.

I am aware that certain samples of crude cyclopentanone were heretofore recognized as not suitable for use in the synthesis of tetramethylolcyclopentanone, and that such crude samples had been purified by painstaking fractional distillation. However fractionation gives a recovery of only about 50% of purified cyclopentanone based on the crude cyclopentanone distilled.

During the development of the present invention crude cyclopentanone was treated with an acid-dichromate oxidizing solution on the hypothesis that the objectionable impurities in the crude material consisted of hydroxylated compounds such as cyclopentanol. Although the acid-dichromate treatment was effective, it was subsequently shown that the presence of hydroxylated impurities did not account for the difficulties encountered in synthesizing tetramethylolcyclopentanone from crude impure cyclopentanone. Subsequently purification procedures other than those involving the use of oxidation were investigated until ultimately the simple, commercially-feasible acid treating process of the example was developed.

It will be apparent to those skilled in the art that many variations may be made in the procedural steps set forth in the foregoing specific example. All such variations and modifications are to be understood as included within the scope of the appended claims.

I claim:

1. A method of purifying crude cyclopentanone which comprises heating said cyclopentanone with a small proportion of a concentrated acid selected from the group of acids consisting of phosphoric acid, chromic acid and hydrochloric acid, and then separating said cyclopentanone from said acid.

2. The method of claim 1 wherein said acid comprises syrupy phosphoric acid.

3. The method of claim 1 wherein said cyclopentanone is separated by distillation.

4. A method of purifying crude cyclopentanone which comprises refluxing said crude material with a small proportion of syrupy phosphoric acid and then distilling the cyclopentanone from the resulting reaction mixture.

5. The method of claim 4 wherein said syrupy phosphoric acid is employed to the extent of about 2 to about 20 volume percent of the volume of the crude cyclopentanone undergoing purification.

6. The method of claim 4 wherein said crude cyclopentanone is refluxed for at least about 5 minutes with about 2 to about 10% of syrupy phosphoric acid, and the cyclopentanone then distilled under reduced pressure from the reaction mixture.

AMOS TURK.

REFERENCES CITED

The following references are of record in the file of this patent:

UNITED STATES PATENTS

| Number | Name | Date |
| --- | --- | --- |
| 1,704,751 | Luther et al. | Mar. 12, 1929 |
| 2,204,956 | Bresler et al. | June 18, 1940 |

FOREIGN PATENTS

| Number | Country | Date |
| --- | --- | --- |
| 505,158 | Germany | Aug. 16, 1930 |